(12) United States Patent
Styles et al.

(10) Patent No.: US 11,563,630 B2
(45) Date of Patent: Jan. 24, 2023

(54) WORKFLOW FOR SELF PROVISIONING SMART WELL CONTROLLER

(71) Applicant: Baker Hughes Oilfield Operations LLC, Houston, TX (US)

(72) Inventors: Nicholas Styles, Houston, TX (US); Ian Brown, Houston, TX (US)

(73) Assignee: Baker Hughes Oilfield Operations, LLC, Houston, TX (US)

( * ) Notice: Subject to any disclaimer, the term of this patent is extended or adjusted under 35 U.S.C. 154(b) by 276 days.

(21) Appl. No.: 17/075,922

(22) Filed: Oct. 21, 2020

(65) Prior Publication Data

US 2021/0119863 A1     Apr. 22, 2021

Related U.S. Application Data

(60) Provisional application No. 62/924,039, filed on Oct. 21, 2019.

(51) Int. Cl.
*G06F 15/173*     (2006.01)
*H04L 41/0806*    (2022.01)
*E21B 47/00*      (2012.01)
*H04L 67/12*      (2022.01)

(52) U.S. Cl.
CPC .......... *H04L 41/0806* (2013.01); *E21B 47/00* (2013.01); *H04L 67/12* (2013.01)

(58) Field of Classification Search
CPC ...... H04L 41/0806; H04L 67/12; E21B 47/00
USPC ....................................................... 709/222
See application file for complete search history.

(56) References Cited

U.S. PATENT DOCUMENTS

| | | | | |
|---|---|---|---|---|
| 7,103,511 | B2* | 9/2006 | Petite ..................... | H04W 8/26 |
| 8,473,619 | B2* | 6/2013 | Baum ................. | H04L 12/2834 |
| | | | | 709/227 |
| 9,100,297 | B2* | 8/2015 | DeHaan ................. | H04L 41/12 |
| 9,225,793 | B2* | 12/2015 | Dutta ..................... | H04L 67/12 |
| 9,253,454 | B2* | 2/2016 | Hobbs ..................... | H04Q 9/00 |

(Continued)

FOREIGN PATENT DOCUMENTS

KR        20090043099 A        5/2009

OTHER PUBLICATIONS

ISA/KR; Search Report and Written Opinion for PCT/US2020/056630; dated Feb. 9, 2021.

*Primary Examiner* — Anthony Mejia
(74) *Attorney, Agent, or Firm* — Crowe & Dunlevy, P.C.

(57) ABSTRACT

Disclosed herein is a system including a wellsite controller. The wellsite controller receives workflow inputs such as wellsite details and communications settings, generates a local configuration entry including the workflow inputs, sensor configuration information about wellsite sensors connected to the controller, and a unique identifier for the controller. The unique identifier is based upon the workflow inputs, the sensor configuration information, and location information for the wellsite. The controller generates a registration message from the local configuration entry. A server receives the registration message, and compares the unique identifier to a store of known identifiers. If the unique identifier does not match one of the known identifiers, the server recognizes the controller as being newly added, adds the wellsite to a monitoring system of the server by creating an entry for the wellsite from the registration message, and attempts to map the wellsite sensors to the entry for the wellsite.

23 Claims, 3 Drawing Sheets

(56) References Cited

U.S. PATENT DOCUMENTS

| | | | |
|---|---|---|---|
| 10,313,303 B2* | 6/2019 | Baum | H04L 12/283 |
| 10,339,791 B2* | 7/2019 | Baum | H04L 12/66 |
| 11,218,878 B2* | 1/2022 | Dawes | H04L 63/1408 |
| 11,240,059 B2* | 2/2022 | Cohn | H04L 12/2827 |
| 2010/0161630 A1* | 6/2010 | Moriwaki | H04L 67/12 707/E17.014 |
| 2015/0236746 A1* | 8/2015 | Scheinkerman | H04B 1/40 375/219 |
| 2018/0284758 A1* | 10/2018 | Celia | G05B 23/0286 |
| 2022/0247722 A1* | 8/2022 | Baum | H04L 12/2807 |

* cited by examiner

WORKFLOW FOR SELF PROVISIONING SMART WELL CONTROLLER

RELATED APPLICATION

This application claims priority to U.S. Provisional Patent Application No. 62/924,039, filed Oct. 21, 2019, entitled, "Workflow for Self Provisioning Smart Well Controller," the disclosure of which is incorporated by reference in its entirety to the maximum extent allowable under the law.

TECHNICAL FIELD

This application is directed to a workflow for a wellsite controller and a remote server that enables self provisioning and self configuration of the wellsite controller at a wellsite for communication with the remote server.

BACKGROUND

It is common for controllers employed at a wellsite to communicate with remote centralized servers to enable remote monitoring of the wellsite. In particular, many such known controllers employ Supervisory Control and Data Acquisition System (SCADA) protocols, such as the "Modbus" communications protocol, for communications with their respective remote centralized servers. While this does enable remote monitoring of the wellsite, the nature of these protocols involves a lengthy manual configuration and provisioning process, utilizing a team of operators and administrators when new equipment (e.g., a wellsite controller) is added or modified at the wellsite or when changes to the well site are made (e.g., control set points moved).

As an example, a typical process for configuration and provisioning of new equipment at a wellsite is now described with reference to the chart 5 of FIG. 1. In general, this process involves the installation of the equipment at the wellsite (10) by a field technician, the configuration of the SCADA system (20) by a SCADA administrator to enable remote collection of data and communications with the equipment at the wellsite, and then system integration by a server administrator to integrate the SCADA system with other systems (30).

The installation of the equipment (10) involves the manual installation of a communications interface for the new equipment at the wellsite (11), and the manual performance of communications tests between the new equipment at the wellsite and the SCADA system (12). These communications tests involve cooperation between the field technician installing the equipment at the wellsite and an administrator of the SCADA system. Then, peripherals such as sensors are manually installed (if not yet installed), set up, and tested, with the settings used being recorded manually (13). At this point, manual reports are generated that capture location and equipment installation data (14).

The SCADA configuration (20) performed by the SCADA administrator includes the location and/or identification of the IP address of the communications interface of the new equipment at the wellsite (21), and then the cooperation with the field technician to perform communications tests between the communications interface and the SCADA system (22). Then, from the settings and installation data recorded by the field technician, the types of the peripherals are established and mapped into the SCADA system (23) by the SCADA administrator. Then, tests are performed by the SCADA administrator to verify that the SCADA system is in fact receiving data from the peripherals at the wellsite via the communications interface (24).

The system integration (30) performed by the server administrator involves the configuration and mapping of the SCADA data (e.g., data received from the equipment at the wellsite via the SCADA system, such as information from the peripherals) to other enterprise systems (31), such as historian applications that track the SCADA data, software interfaces permitting interface between the SCADA data and Windows computers, and/or custom databases. In addition, the server administrator may manually integrate the SCADA data with inventory and reliability tracking systems, as well as analytics platforms (32).

As can be appreciated, the above described conventional new equipment configuration and provisioning process is time consuming and prone to human error due to the various different tasks that are manually performed due to inefficient and insufficient data sharing between the various hardware and software systems used. As the configuration at the wellsite increases in complexity (e.g., by the addition of new peripherals), the complexity of this configuration and provisioning process only increases, becoming even more prone to human error. As can also be appreciated, due to the manual performance of these tasks, when changes are to be made to the configuration of the equipment, a field technician is required to visit the wellsite, driving up labor costs. Still further, the conventional SCADA systems typically used may not provide adequate data security, and may have a data throughput speed that is less than desired for real time remote monitoring and/or control of the equipment at the wellsite.

For these reasons, further development in the area of wellsite controllers and workflows for provisioning and configuring such wellsite controllers is needed.

SUMMARY

In general, disclosed herein are a wellsite controller and remove server executing a workflow that enables the wellsite controller to provision and configure itself and its peripherals for communication with the remote server over the internet in a way that reduces the number of tasks manually performed by technicians and administrators so as to decrease set up time and decrease downtime, while avoiding the potential for human errors such as data entry errors.

The disclosed workflow allows the use of protocols other than SCADA and Modbus, such as Message Queuing Telemetry Transport (MQTT) push based messaging, for communication between the wellsite controller and remote server. Therefore, this disclosed workflow is based upon a "push" methodology rather than a "poll" methodology. In this workflow, the wellsite controller is loaded or preloaded with details about the production environment at the wellsite and then identifies itself to the remote server and communicates details of its configuration to the remote server. The remote server in turn provisions and configures itself for communications with the wellsite controller and can direct data flow from the wellsite controller to back-end enterprise systems.

This way, much of the manual work previously performed by human technicians and administrators is eliminated, and changes to equipment at the wellsite can be easily effectuated. In addition, the MQTT protocol provides for quicker data transmission between the wellsite controller and the remote server. Still further, encryption may be applied on top of the MQTT protocol to enhance data security For example, disclosed herein is a system that includes a controller to be located at a wellsite. This controller is configured to receive workflow inputs, the workflow inputs including wellsite details and communications settings, and to generate a local configuration entry including the workflow inputs, sensor configuration information about wellsite sensors to be connected to the controller, and a unique identifier for the controller. The unique identifier for the controller is based upon the workflow inputs, the sensor configuration information, and location information about a location of the wellsite. The controller is further configured to generate a registration message based upon the local configuration entry. The system also includes a server that is configured to receive the registration message as pushed thereto by the controller, and compare the unique identifier to a store of known identifiers. If the unique identifier does not match one of the store of known identifiers, the server is configured to add the wellsite to a monitoring system of the server by creating an entry for the wellsite from the registration message, attempt to map the wellsite sensors to the entry for the wellsite in the monitoring system.

If the wellsite sensors were successfully mapped to the entry for the wellsite in the monitoring system, the server may be configured to connect the controller to at least one external enterprise system such that data from the wellsite sensors is sent to the at least one external enterprise system.

If the wellsite sensors were not successfully mapped to the entry for the wellsite in the monitoring system, the server may be configured to generate a verification message indicating that the wellsite sensors were not successfully mapped to the entry for the wellsite in the monitoring system.

If the wellsite sensors were successfully mapped to the entry for the wellsite in the monitoring system, the server may be configured to generate a verification message indicating that the wellsite sensors were successfully mapped to the entry for the wellsite in the monitoring system.

If the unique identifier does not match one of the store of known identifiers, the server may be configured to recognize the controller as being newly added and add the unique identifier and the wellsite details to the store of known identifiers.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
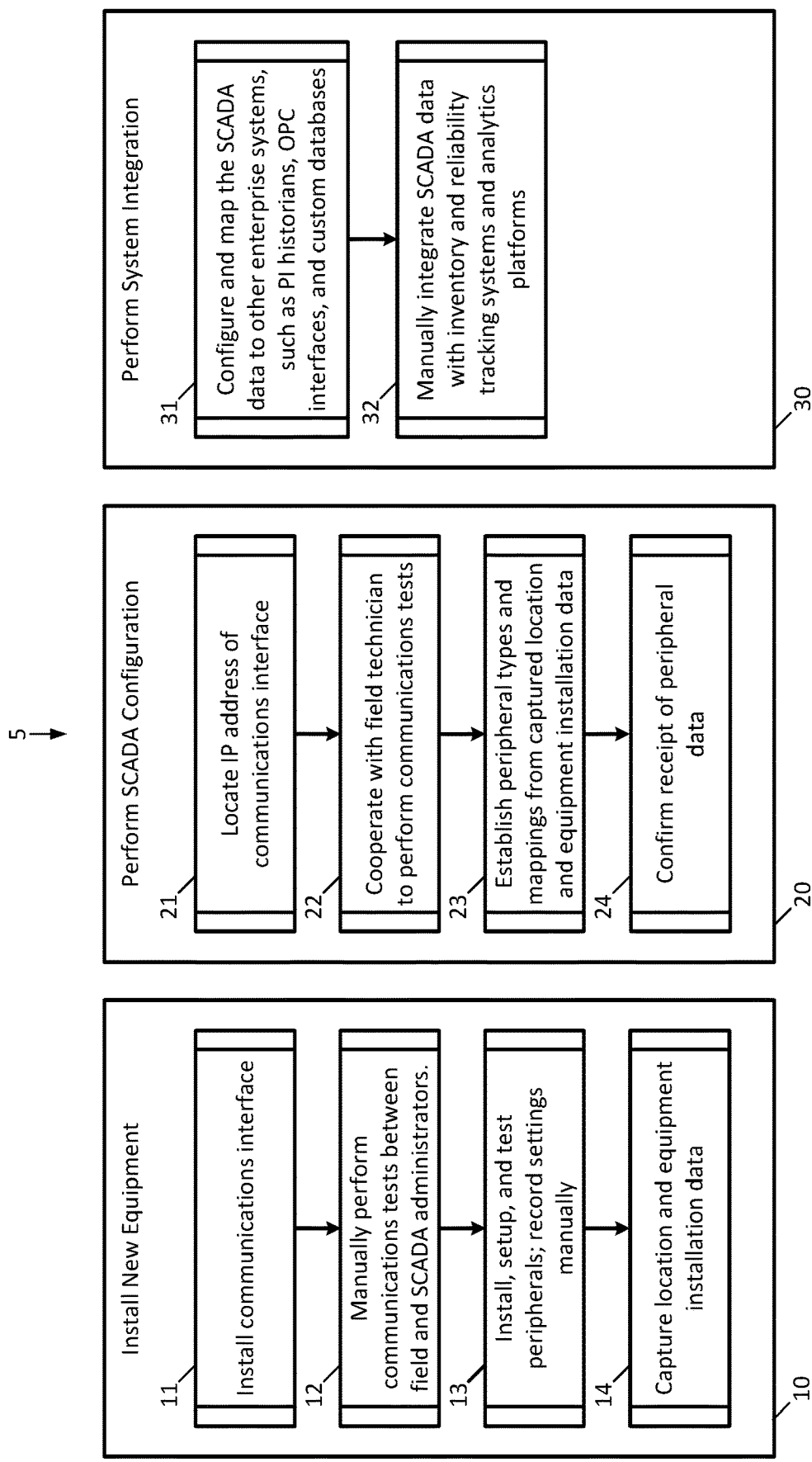
FIG. 1 is a chart showing typical prior art process for configuration and provisioning of a wellsite controller at a wellsite.
Figure 2:
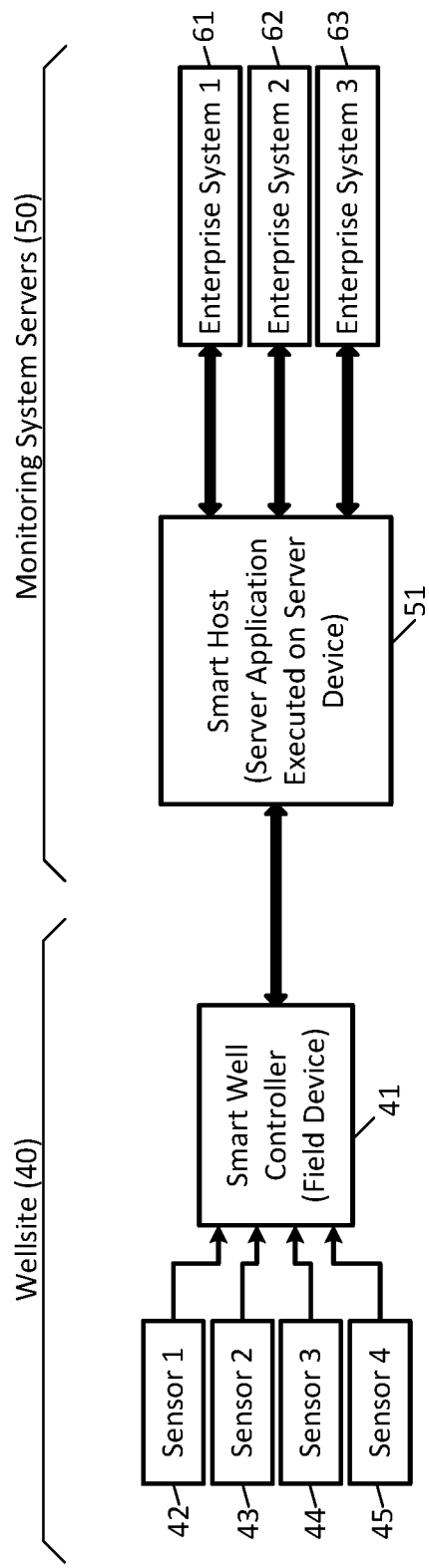
FIG. 2 is a block diagram showing the hardware upon which the workflow described herein may be performed.

General details of the workflow disclosed herein have been given above. Specific details will be given below, but first, the hardware upon which the workflow is performed will be described with reference to FIG. 2. The hardware placed in the field includes a smart well controller 41 (which can be generically referred to as a wellsite controller) placed at the wellsite 40, with multiple sensors 42-45 placed at the wellsite 40 and connected to the smart well controller 41. The smart well controller 41 has a network interface, such as a modem, integrated therein, and may permit easy installation of modular interfaces for additional network interfaces. The sensors 42-45 may be analog sensors that provide data about conditions of the production environment at the wellsite 40 to the smart well controller 41.

The hardware remotely located from the field is comprised of monitoring system servers 50. A smart host 51, which is a server application executed on a server, is in communication with the smart well controller 41 over the internet and receives wellsite data from the smart well controller 41. The smart host 51, in turn, is in communication with multiple enterprise systems 61-63. These enterprise systems may be, for example, real-time historian applications, such as the Process Information (PI) application that tracks wellsite data communicated to it by the smart host 51, software interfaces, such as the Open Platform Communications interface (OPC) permitting interface between the smart host and Windows computers, and/or other custom databases.

Although a limited number of sensors 42-45 and enterprise systems 61-63 are shown for brevity and ease of explanation, it should be understood that there may be any number of such sensors and enterprise systems, and that such sensors and enterprise systems may be of any suitable types.

Figure 3:
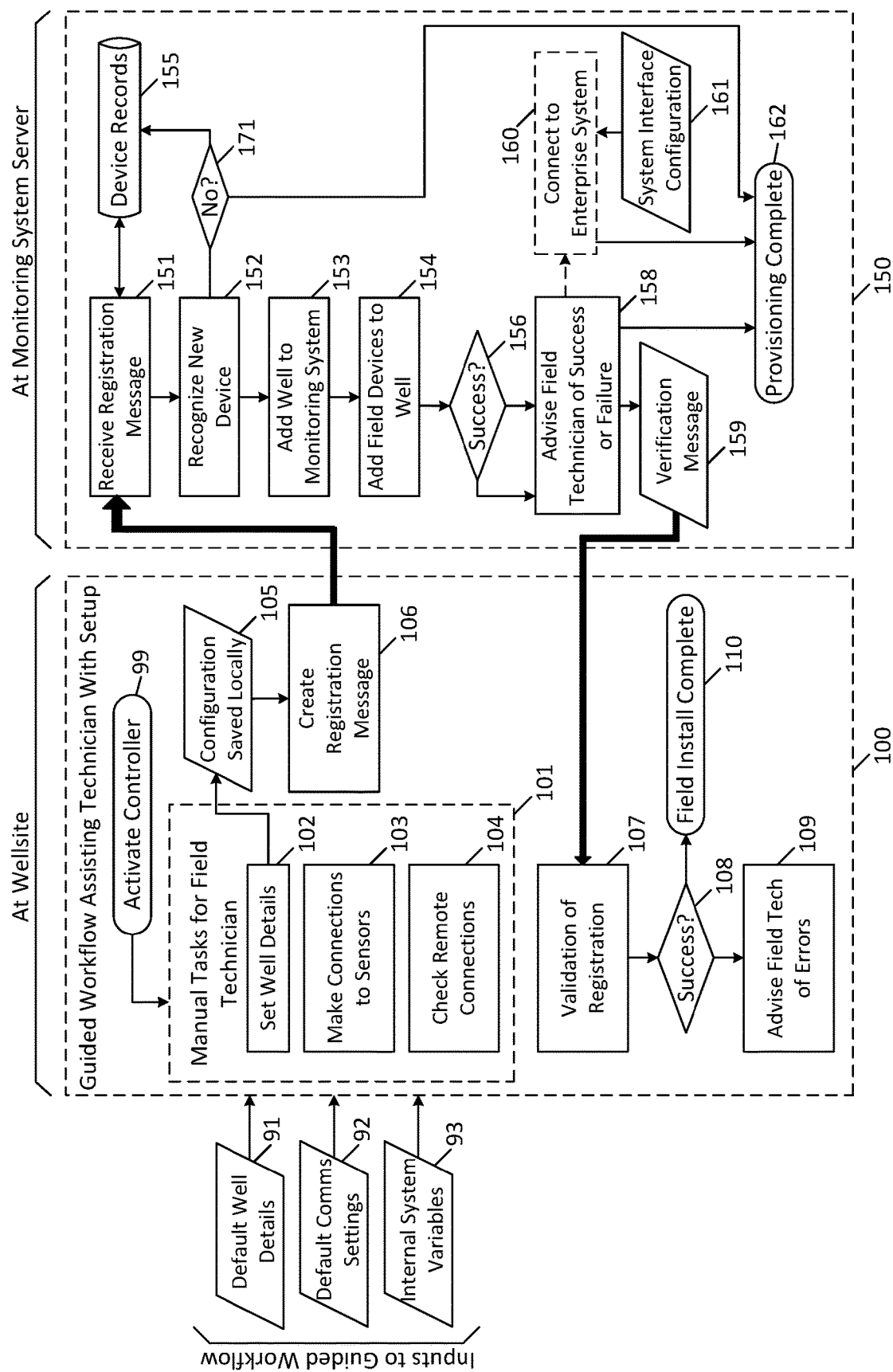
FIG. 3 is a flowchart of a workflow disclosed herein for self configuration and provisioning of a wellsite controller at a wellsite for communication with a remote server.

The workflow is now described with additional reference to FIG. 3. As will be explained below, the workflow is comprised of steps 100 performed at the wellsite, and steps 150 performed at the monitoring system server. Prior to installation of the smart well controller 41 at the wellsite, or in some cases after installation, inputs to the workflow are defined. These inputs include default well details 91, which may be pre-configured for the specific wellsite, or may be pre-set to an organization level default. Such organization level defaults may be a default well configuration (not specific to the wellsite), a configuration for wells in a specific field, or a configuration for wells in a specific region, for example. The default well details 91 may also include standard tags and sensor mapping templates.

The inputs to the workflow also include default communications settings 92, such as preconfigured connection information for connection to the smart host 51, for example, the server address and log-in information for the server. Other preconfigured connection information may be network settings for use by the smart well controller 41, such as security and local network settings.

The inputs to the workflow also include internal system variables 93, which may be automatically generated uneditable data such as unique identifiers for the smart well controller 41 and/or the sensors 42-45, as well as security and encryption tokens.

After physical installation of the smart well controller 41 at the wellsite, it is activated (99), and the manual tasks to be performed by the field technician are begun (101). In particular, the field technician reviews the default well details 91 that have been set (102), and accepts or edits these values accordingly. In addition, at this step, the field technician confirms the well coordinates. The field technician also makes the connections between the smart well controller 41 and the sensors 42-45 (103) by physically and electrically connecting cables therebetween, may perform validation to see that data is being gathered correctly from the sensors 42-45, and may troubleshoot the connections if needed. The field technician additionally checks to verify that the connection between the smart well controller 41 and the remotely located smart host 51 is present and functioning properly (104), such as by testing communication within the MQTT client.

This completes the tasks manually performed by the field technician. Note that, as compared to the prior art systems, much of the manually performed tasks have been eliminated, and that the remaining steps described below performed by the smart well controller 41 and smart host 51 can be considered to be a set of rules to be followed that enable the self provisioning and configuration of the smart well controller 41 and its sensors 42-45 without further user input, which was previously impossible and previously required numerous additional manual steps such as those described in the background section of this application.

The smart well controller 41 saves the well details set by the technician (105) as well as details of the sensors (peripherals) 42-45, and from this configuration data, creates a registration message to be pushed to the smart host 51 (106). The registration message contains a unique identifier for the smart well controller 41 in its current configuration, is labeled with a specific registration flag, and contains the well details.

The smart host 51 checks incoming messages for the registration flag to determine that it has received a registration messages (151), and compares the unique identifier contained in the received registration message to the unique identifiers stored in a store of device records 155 to determine whether the smart well controller 41 has previously been provisioned in its current configuration. If the smart well controller 41 has been previously provisioned in its current configuration (171), then re-provisioning is not necessary and provisioning can therefore be considered to be compete (162). If the smart well controller 41 has not been provisioned, or has not been provisioned in its current configuration (171), then the smart well controller 41 is added to the store of device records 155 by adding to the store of device records 155 the unique identifier as well as the well details contained in the registration message.

In addition, the well is added to the monitoring system (153) in the smart host 51. This is performed by creating an entry for the well including the well name, data about the wellsite configuration contained in the registration message, and the location of the well contained in the registration message. Then, the sensors (peripherals) 42-45 are added to the well entry in the monitoring system (154) using the information about the sensors 42-45 contained in the registration message. In the case where a previous well entry existed but the configuration has been changed (and therefore re-provisioning is to be performed), the well entry is altered accordingly to include the data about the wellsite configuration contained in the registration message, and the sensors 42-45 are added as described.

If this well entry was not successfully completed (156), then the field technician is advised of the failure by (158) by creating a verification message 159 containing this information and sending this verification message to the smart well controller 41. In this case of failure, the verification message 159 may contain details about the failure to assist the field technician with troubleshooting.

If the sensors 42-45 were successfully added to the well entry in the monitoring system successfully competed (156), or if the well entry was successfully updated as described, then the well in its current configuration can be considered to be provisioned or registered and the field technician can be advised of the success and of the status of the well entry (158) by creating a verification message 159 containing this information and sending this verification message to the smart well controller 41. If the smart well controller 41 is not to be connected to one or more enterprise systems 61-63, then provisioning is at this point considered to be complete (162).

If the smart well controller 41 is to be connected to one or more enterprise systems 61-63 such that data from the smart well controller 41 is to be routed to such enterprise systems (160), the smart host 51 retrieves stored system interface configuration information 161, which contains automated scripts used to automate setup between the smart well controller 41 and the enterprise systems, and executes the appropriate script to effectuate the setup. At this point, provisioning is then considered to be complete (162).

Returning now to the verification message 159 sent to the smart well controller 41, the smart well controller 41 displays the verification message 159 to the field technician. If the verification message 159 indicates success (108), then the field installation is complete (110). If the verification message 159 indicates failure (108), then the field technician is advised of the failure and provided with the details about the failure (109).

It should be noted that the above described steps outside of the manual tasks 101 are performed without further user input and without human activity, and cannot be performed mentally because they are based in, and arise from, the physical hardware used. It should also be noted that since the above described steps arise from the use of the physical hardware used, namely the smart well controller 41, the sensors 42-45, and server device executing the smart host 51, the above disclosure uses technology to solve a problem arising from deficiencies of the technological field itself, and is a real, concrete, non-abstract solution to a real world technological problem. In fact, by performing the steps described above, the operation of the smart well controller 41 and server device executing the smart host 51 is improved because errors that previously occurred during configuration and provisioning are eliminated. Still further, note that the self configuration and provisioning described above allows the same smart well controller 41 and smart host 51 to be used with a variety of different sensors 42-45 and enterprise systems 61-63.

Once provisioning is complete, the smart well controller 41 may proceed to normal operation in which the smart well controller 41 acquires data from the sensors 42-45, and sends the data to the smart host 51. The smart host 51 may then send the data received from the smart well controller 41 to the enterprise systems 61-63. Note that, in some configurations, the data acquired from the sensors 42-45 may be pre-processed by the smart well controller 41 prior to sending the data to the smart host 51 so as to facilitate quick and accurate processing of the data by the smart host 51 and/or the enterprise systems 61-63.

In addition, in some configurations, the smart well controller 41 may validate the quality of the data acquired from the sensors 42-45 prior to sending the data to the smart host 51. Each parameter or condition monitored by the sensors 42-45 has defined minimum and maximum values associated therewith, and values output by the sensors 42-45 that are below the defined minimum value or above the defined maximum value may be considered out of the range of normal (or possible) operation. Therefore, to validate the quality of data, the smart well controller 41 may compare the acquired data to the defined minimum and maximum values, and flag acquired data values that are out of range and/or flag acquired data values that are in range. This way, the smart host 51 and enterprise systems 61-63 do not waste processing time on data values that are out of range.

The defined minimum and maximum values for the parameters and conditions monitored by the sensors 42-45 may be received by the smart well controller 41 from the default well details 91, may be manually entered into the smart well controller 41 by the field technician at step 102, or may be determined by the smart well controller 41 by performing analysis on a series of values obtained from the sensors 42-45 over time.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A system comprising:
a controller to be located at a wellsite, the controller configured to:
receive workflow inputs, the workflow inputs including wellsite details and communications settings;
generate a local configuration entry including the workflow inputs, sensor configuration information about wellsite sensors to be connected to the controller, and a unique identifier for the controller;
wherein the unique identifier for the controller is based upon the workflow inputs, the sensor configuration information, and location information about a location of the wellsite; and
generate a registration message based upon the local configuration entry;
a server configured to:
receive the registration message as pushed thereto by the controller;
compare the unique identifier to a store of known identifiers; and
if the unique identifier does not match one of the store of known identifiers:
add the wellsite to a monitoring system of the server by creating an entry for the wellsite from the registration message; and
attempt to map the wellsite sensors to the entry for the wellsite in the monitoring system.

2. The system of claim 1, wherein if the wellsite sensors were successfully mapped to the entry for the wellsite in the monitoring system, the server is configured to connect the controller to at least one external enterprise system such that data from the wellsite sensors is sent to the at least one external enterprise system.

3. The system of claim 1, wherein if the wellsite sensors were not successfully mapped to the entry for the wellsite in the monitoring system, the server is configured to generate a verification message indicating that the wellsite sensors were not successfully mapped to the entry for the wellsite in the monitoring system.

4. The system of claim 1, wherein if the wellsite sensors were successfully mapped to the entry for the wellsite in the monitoring system, the server is configured to generate a verification message indicating that the wellsite sensors were successfully mapped to the entry for the wellsite in the monitoring system.

5. The system of claim 1, wherein if the unique identifier does not match one of the store of known identifiers, the server is configured to recognize the controller as being newly added and add the unique identifier and the and wellsite details to the store of known identifiers.

6. A method of operating a system including a controller to be installed at a wellsite and a remotely installed monitoring system server, the method comprising:
receiving user input of well details at the controller;
generating a registration message based upon the well details, and sending the registration message from the controller to the monitoring system server;
provisioning the controller in its current configuration, within the monitoring system server; and
sending a verification message from the monitoring system server to the controller indicating whether the controller was successfully provisioned.

7. The method of claim 6, wherein the well details includes a unique identifier for the controller in its current configuration; and wherein provisioning the controller in its current configuration, within the monitoring system server, comprises compare the unique identifier to a store of known identifiers and, if the unique identifier does not match one of the store of known identifiers, add the wellsite to a monitoring system of the server by creating an entry for the wellsite from the registration message, but if the unique identifier does match one of the store of known identifiers, then provisioning of the controller in its current configuration is complete.

8. The method of claim 6, wherein the well details include which sensors are installed at the wellsite to provide production environment condition data.

9. The method of claim 6, wherein the well details are specifically pre-configured for the wellsite.

10. The method of claim 6, wherein the well details are pre-configured to an organization level default.

11. The method of claim 10, wherein the organization level default represents a default well configuration not specific to the well site.

12. The method of claim 10, wherein the organization level default represents a default well configuration for wells within a specific field.

13. The method of claim 10, wherein the organization level default represents a default well configuration for wells in a specific geographical region.

14. The method of claim 10, wherein the organization level default includes standard sensor mapping templates.

15. The method of claim 6, wherein the registration message is also generated based upon default communications settings.

16. The method of claim 15, wherein the default communications settings include pre-configured connection information for connected between the controller and the remotely installed monitoring system server.

17. The method of claim 15, wherein the pre-configured connection information includes local network settings and security settings.

18. The method of claim 6, wherein the registration message is also generated based upon internal system variables.

19. The method of claim 18, wherein the internal system variables include unique identifiers for the controller and sensors connected to the controller at the well site.

20. The method of claim 19, wherein the internal system variables include security and encryption tokens.

21. The method of claim 6, further comprising, upon completion of provisioning: using the controller to acquire data from sensors connected thereto and sending that data to the controller; and sending the received data acquired by the sensors from the controller to at least one enterprise system.

22. The method of claim 21, further comprising, prior to sending the data acquired from the sensors to the controller, pre-processing the data.

23. The method of claim 22, wherein pre-processing the data includes validation quality of the data by verifying that different elements of the data are between defined minimum and maximum threshold values.

\* \* \* \* \*